W. M. WILLIAMS.
Coffee Pot.

No. 84,456.

Patented Nov. 24, 1868.

Witnesses.
Chas. H. Boyle,

Inventor.
Wm. M. Williams

WILLIAM M. WILLIAMS, OF ST. LOUIS, MISSOURI.

Letters Patent No. 84,456, dated November 24, 1868.

IMPROVEMENT IN COFFEE-POTS.

The Schedule referred to in these Letters Patent and making part of the same.

*To all whom it may concern:*

Be it known that I, WILLIAM M. WILLIAMS, of St. Louis, in the county of St. Louis, and State of Missouri, have invented a new and useful Coffee-Pot; and I do hereby declare that the following is a full and exact description thereof, reference being had to the accompanying drawings, and to the letters of reference thereon.

The nature of my invention consists in a novel arrangement of cone-tubes in the bottom of a pot, combined with a strainer, centrally located in regard to said tubes, and a condenser-lid, by means of which arrangement an increase of heating-surface is obtained, the substance to be decocted is quickly and thoroughly acted upon, and the aroma of the latter is perfectly retained.

To enable those skilled herein to make and use my said invention, I will now describe its construction and application, referring to the accompanying drawings, of which—

Figure 1:
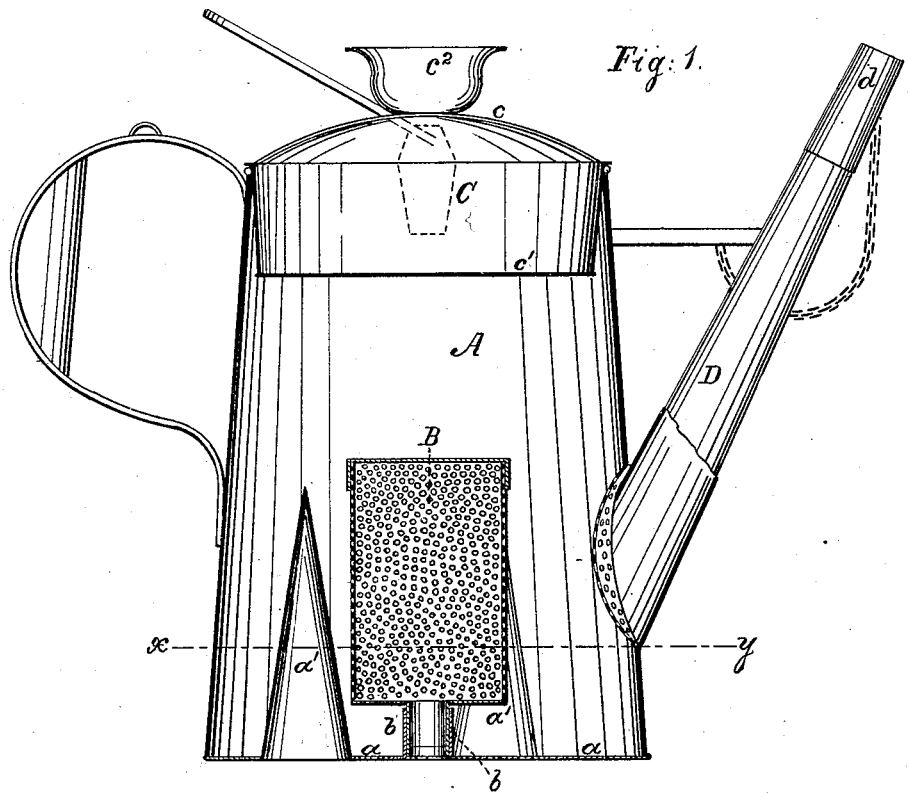
Figure 1 is a vertical sectional elevation of said coffee-pot.
Figure 2:
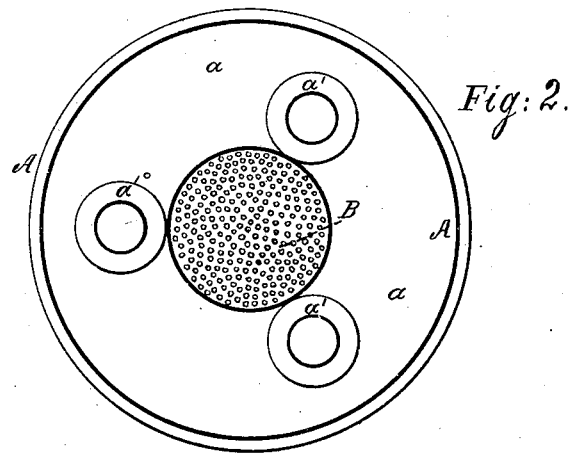
Figure 2 is a top sectional plan along the line $x\,y$.

I construct the exterior vessel, A, of the general shape usual, and with usual handle, spout, &c., attachments. The surface hereof which is exposed to the action of the heat, however, is arranged with a number of conical cavities, $a'$. These cavities permit the hot gases from the furnace or fire-room to penetrate high into the interior of the coffee- or other vessel, acting similarly unto the tubes in so-called tubular boiler. Thus the fluids contained in said vessel are subjected to the action of heat at the bottom surface $a$. Then said cone-tubes $a'$ divide the said fluid volume, and, by transmitting the heat, through their metallic sides, to each part of said fluid immediately surrounding the tube, the heating-action is greatly intensified, thereby expediting the processes of cooking, and insuring economy of time and expense in said processes.

I would especially mention that said tubes $a'$ may be made cylindrical in shape, or of any other form, the action thereof, to introduce heated gases into the higher fluid volumes of the vessel, being, to a great extent, independent of said form.

Usually, in the application of this portion of my invention, the conical tubes will be found affording facilities for easy manufacture and easy cleansing of the vessels after use, which may cause their application in preference to other forms.

The strainer B, to receive the ground coffee, tea, or other substance to be decocted, is centrally placed between the tubes $a'$. The strainer B can be easily withdrawn from its socket-seat, $b$, (secured to the bottom, $a$,) for cleansing, &c. This, moreover, permits the application of the vessel A for purposes of heating fluid, or cooking generally, when a strainer would be unnecessary and an obstruction.

The top of the vessel or pot A is closed by the lid C. This is itself arranged as a receptacle, having a bottom, sides, and top. When the lid is in its position, the top, $c$, thereof forms the lid proper of the vessel A. The bottom, $c^1$, then reaches some distance into the vessel A. The lid has a cup, $c^2$, through which fluids may be poured into the interior of the lid.

The object of constructing the lid C as a receptacle is as follows:

In making decoctions of aromatic plants, seeds, &c., the hot fluids used to abstract from such plants their aroma or nourishments are constantly emitting large volumes of vapor, after said extraction of aroma and nourishment has already, to some extent, been accomplished. Said vapors thus charged pass the lid of the common forms of cooking-vessels, and this escape causes a serious loss. To avoid this, it will only be necessary, in the operation of my said invention, to fill the interior of the lid C (through $c^2$) with cold water, for instance. This will reduce the temperature of the bottom, $c^1$, and sides of C to such extent that the vapors of the decoction in the vessel A, charged with aroma and nourishment, in striking against said bottom and sides of the lid C, will give off a portion of their heat to the metal of the lid, and, through this, to the fluid within, whilst, by this reduction of temperature, said vapors will be condensed to fluid form, and drop back into the vessel A. Moreover, as the aroma of coffee, tea, and other substances is seated in certain oils, which are volatile, and said oils, by the action of heat, being volatilized, these would also escape in the common arrangement of lids of these cooking-vessels; but, in the same manner as were the fluid vapors condensed, the volatile oils will again be formed out of the vapors thereof, when said vapors touch the lid C, thereby again preventing a loss thereof.

When the evolution of steam or vapor from the fluids in the vessel A is not too great, the spout D may be closed by the cap $d$, thus preventing here a waste of vapor.

The water contained in the lid C will, in the process of cooking, gradually become heated, and said heated water can be used advantageously for all purposes usual. There is, therefore, in the application of a condenser-lid, no loss of heat.

By the arrangement herein described, a very efficient utensil is produced. The substance to be brewed is held by the strainer between the tubes $a'$, where it is immediately and thoroughly acted upon by the heat arising in the latter.

The arrangement of the condenser-lid prevents all escape of the aroma.

Having thus fully described my invention,

What I claim, is—

The vessel A, with tubes $a'$, strainer B, and condenser-lid C, the strainer being located centrally in regard to the tubes, and the whole being combined and arranged as and for the purpose set forth.

WM. M. WILLIAMS.

Witnesses:
M. RANDOLPH,
CHAS. H. BOYLE.